United States Patent [19]

Adams et al.

[11] 4,422,258
[45] Dec. 27, 1983

[54] SIGNALLING DEVICE AND MEASUREMENT OF PULL ON A FISHING LINE

[76] Inventors: Billy R. Adams, P.O. Box 2526, Jacksonville, Fla. 32203; William C. Burchett, 843 Bellefonte Princess Rd., Ashland, Ky. 41101

[21] Appl. No.: 361,237

[22] Filed: Mar. 24, 1982

[51] Int. Cl.³ .............................................. A01K 97/12
[52] U.S. Cl. ........................................ 43/17; 43/17.5
[58] Field of Search ................... 43/17, 16, 17.1, 17.5

[56] References Cited

U.S. PATENT DOCUMENTS

| | | | |
|---|---|---|---|
| 2,680,842 | 6/1954 | Opphile | 43/17 |
| 2,869,275 | 1/1959 | Levin | 43/17 |
| 3,624,689 | 11/1971 | Rizzo | 43/17 |
| 3,698,116 | 10/1972 | Rosier | 43/17 |
| 4,376,349 | 3/1983 | Yarczower | 43/17.5 |
| 4,384,425 | 5/1983 | Lemons, Sr. | 43/17.5 |

FOREIGN PATENT DOCUMENTS 2092871 8/1982 United Kingdom ................ 43/17

Primary Examiner—Nicholas P. Godici
Assistant Examiner—Kurt Rowan
Attorney, Agent, or Firm—Karl W. Flocks; Sheridan Neimark

[57] ABSTRACT

An attachment incorporated on or in a fishing reel to signal a fish pulling on the line with an indication of the amount of pull by different colored lights and a scale indication. The fishing line passing through the device passes over a spring biased rod which operates separate contacts as it moves against the spring force, operating different colored lights, one at a time, and moving a scale attached to the rod downward past an indicating window to numerically indicate amount of pull on the line.

14 Claims, 5 Drawing Figures

U.S. Patent      Dec. 27, 1983      4,422,258
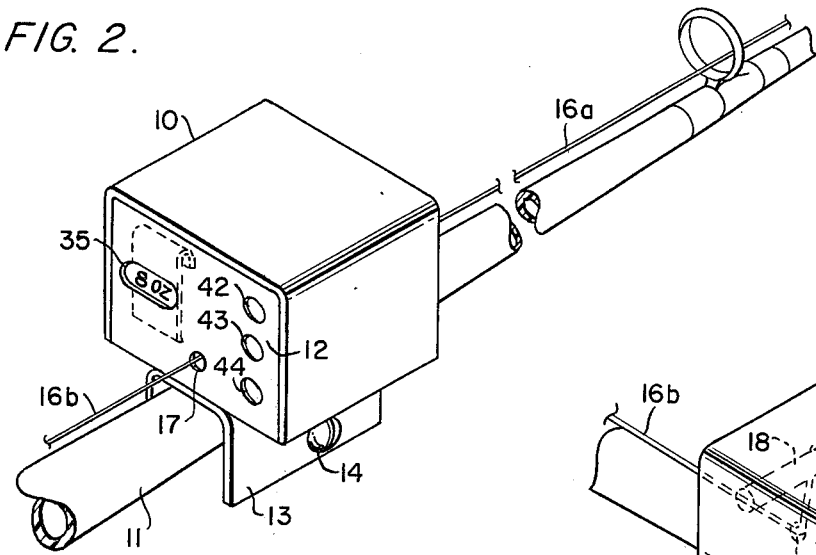
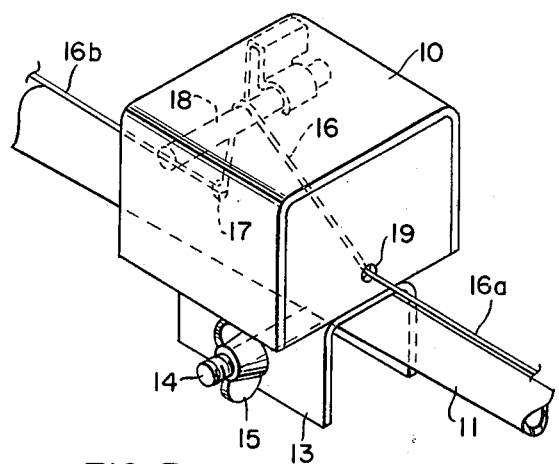
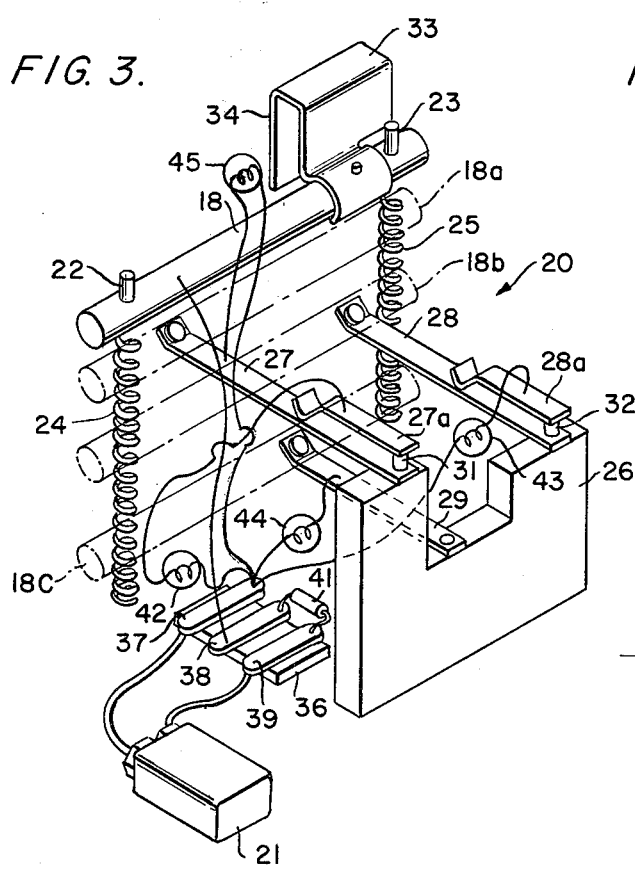
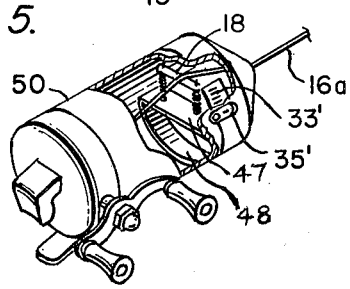
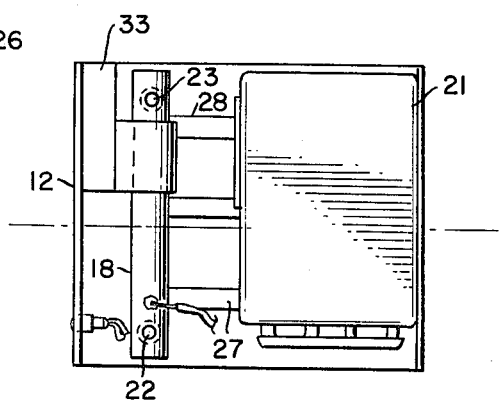

SIGNALLING DEVICE AND MEASUREMENT OF PULL ON A FISHING LINE

BACKGROUND OF THE INVENTION

The present invention relates to a signalling device for use with a fishing rod to indicate pressure on the fishing line by illuminated means. A scale may also indicate the amount of pull in numerical denominations while different colored lights indicate different ranges for the amount of pull on the line.

Prior art patents have disclosed devices which produce visible or audible signals when there is a nibble on a fishing line and have made these indicators adjustable to operate only for predetermined pulls or tugs on the line. Plurality of lights have been used but to indicate pulls on different lines. Also different amounts of pull have been indicated by flashing light which becomes a steady beam or changes to an audible signal. The use of indicia to indicate pull and the use of spring biased switches of different types to control signalling devices are also known.

SUMMARY OF THE INVENTION

It is an object of the present invention to indicate by a plurality of lights not only a pull or tug on a fishing line but the range of intensity of the pull by a separate colored light for each range.

It is a further object of the present invention to lower the drain on a battery power source by having only one indicator light lit as the intensity iof pull passes through each predetermined range.

It is still another object of the present invention to indicate numerically the pull on the fishing line within each range.

In order to accomplish the above objects, a fishing line passes through the device of the present invention, passing over a spring biased rod so that a pull on the line operates against the spring force and forces the rod past extending switch contacts, first closing the circuit through a battery and one colored light and then opening the contact as further force is applied and the circuit is closed through the next contact encountered by the rod being further forced against the force of the spring.

BRIEF DESCRIPTION OF THE DRAWINGS

The invention will now be described in detail in connection with the accompanying drawings in which:

FIG. 1 is a right front perspective view of the signalling device for use with a fishing rod showing a preferred embodiment of the present invention;

FIG. 2 is a right rear perspective view of the device of FIG. 1;

FIG. 3 is an enlarged perspective view of the internal parts of the device of FIG. 1; and FIG. 4 is a top view of the internal parts of the device of FIG. 1 with the battery in its holder.

FIG. 5 is a perspective view of another embodiment of the present invention incorporating the invention within a fishing reel.

DESCRIPTION OF THE PREFERRED EMBODIMENTS

The signalling device in casing 10 mounted on a fishing rod 11 is shown in FIGS. 1 and 2. In the embodiment shown the device has the casing 10 mounted on rod 11 by means of U-shaped bracket 13 attached to casing 10, such as by welding thereto. The U-shaped bracket 13 mounts on rod 11 by compression of the ends of bracket 13 by screw 14 and wing nut 15. Although the signalling device is illustrated as an add-on device or attachment mounted on the fishing rod, it could also be a device built integral with the rod or incorporated within a fishing reel within the scope of the present invention.

Fishing line 16 passes through casing 10 with line section 16a extending toward the front of rod 11 and the hook end, and line section 16b extending to the rear toward the fishing reel (not shown) also mounted on rod 11. Line 16 from the reel along section 16b passes into casing 10 through hole 17, over rod 18, and out of casing 10 through hole 19 to the front end of fishing rod 11 along line section 16a to the hook end of line 16.

Rod 18 is a part of switching mechanism 20 which mechanism is illustrated in FIG. 3 in the oriented position it would occupy in casing 10 in FIG. 1, but shown enlarged in FIG. 3. A top plan view of switching mechanism 20 is shown in FIG. 4 but here battery 21 is shown positioned in its bracket over switching mechanism 20.

In switching mechanism 20, switch rod 18 is mounted on rods 22, 23 and supported on coiled springs 24, 25. Insulator block 26 cut out to have three, in this case, levels of top surface have a resilient elongated contact attached to each level of top surface. Each of elongated contacts 27, 28 and 29 extend into the vertical path of switch rod 18 wherein contact 27 makes contact with switch rod 18 at its position 18a, contact 28 makes contact with switch rod 18 at its position 18b, and contact 29 makes contact with switch rod 18 at its lowest position 18c, each of positions 18a, 18b, and 18c indicated in dashed-dot outline in FIG. 3.

Mounted above elongated contacts 27 and 28 and separated from them at their points of attachment by insulators 31 and 32, respectively, are auxiliary contacts 27a and 28a, respectively.

Mounted on switch rod 18 is scale 33 having substantially a U shape with a surface 34 having legends thereon which are exposed through hole 35 on side 12 of casing 10 which faces to the rear of fishing rod 11 where such legends can be read by a fisherman using fishing rod 11.

FIG. 3 also shows the electrical connections whereby different colored lamps are lit according to the amount of pull on line 16. Terminal block 36 having terminals 37, 38 and 39 has battery 21 connected to terminals 37 and 39. Diode 41 is connected in the circuit between terminals 38 and 39 in series with battery 21 to accommodate a 9-volt battery 21, which is found in a miniature size suitable for use on a fishing rod, to 6-volt bulbs which are generally available. Such bulbs or lamps for the present device are preferred in color, as, for example, yellow lamp 42 connected from terminal 37 to auxiliary contact 27a; green lamp 43 connected from same terminal 37 to auxiliary contact 28a; and red lamp 44 also connected from terminal 37 to contact 29. Switch rod 12 is electrically connected to terminal 38. Thus, a circuit is formed with battery 21, diode 41, and switch rod 18 in series and with only one of lamps 42, 43 or 44 also connected in this series circuit, depending which of elongated contacts 27, 28 or 29 has a closed circuit, through its auxiliary contact 27a and 28a, or without an auxiliary contact in the case of contacts 29, through its respective connecting lamp to terminal 37 and battery 21. A lamp 45 which is used to light the scale surface 34 is connected between elongated contact 27 and terminal 37 so that lamp 45 remains on if there is any tension on line 16 sufficient for rod 18 to contact contact 27.

Each of auxiliary contacts 27a and 28a is formed with a V-shaped end on its end opposite from the end connected to insulation 31 and 32, respectively. When no force, or only a small force, is exerted on the end of either contact 27 or 28 by the downward movement of switch rod 18, there is electrical contact at the V-shaped end between the contact and its respective auxiliary contact. Such is the case with contacts 27, 27a when switch rod 18 is in position 18a. As switch rod 18 moves downward, resilient contact 27 is bent downward and breaks contact with auxiliary contact 27a, thereby breaking electrical contact and extinguishing yellow lamp 42. When switch rod 18 reaches position 18b, it contacts contact 28 with a closed circuit through auxiliary contact 28a lighting green lamp 43. As switch rod 18 proceeds still lower to position 18c, resilient contact 28 is also bent and breaks contact with its auxiliary contact 28a extinguishing green lamp 43, and contact is made by switch rod 18 with contact 29 thereby lighting red lamp 44 indicating maximum downward pressure on rod 18. Contacts 27 and 28 must be quite resilient to bend sufficiently for the full travel downward of rod 18 and return to their original extended position. Since contact 29 is located at the bottom of travel for rod 18, it need not be as resilient as the aforementioned contacts, and it does not need an auxiliary contact.

Lamps 42, 43 and 44 are located at openings in the side 12 of casing 10 to the rear of the rod 11 so as to be easily seen by the fisherman handling the fishing rod.

In operation, fishing line 16 passing through casing 10 will have a pull exerted by a fish on the line in which case fishing line 16 becomes taut with a tendency to straighten between holes 17 and 19, thereby exerting a downward force on switch rod 18 and lighting yellow lamp 42. As the pull increases, green lamp 43 is lit and yellow lamp 42 is extinguished. As the pull on the line is further increased, the red lamp is lit and the green lamp is extinguished. At the same time the numerical amount of the weight of pull is shown by scale 33 through window 35, being lit the whole time by lamp 45.

Other embodiments of the invention are within the present invention. Such device may be build integral with a fishing rod or incorporated in a fishing reel as well as attached separately on to a pole. Also, although the movement of the switch rod 18 is designated as downward with increasing pull on the line, since the forces are pull on the line opposed by springs, it should operate in any manner where the switch rod 18 travels in a path transverse and perpendicular to the extension of line 16.

FIG. 5 shows the embodiment with the device inside a fishing reel cover 50. A scale 33' is mounted on rod 18 but, in this case, at the side of rod 18 in order to pass by opening 35' in cover 50. This, of course, involves a more circular shape than in the previous embodiment in order to conform to the circular shape of cover 50.

In the embodiment of FIGS. 1–4 the case had rectangular sides and therefore a flat slab was used as a base for the apparatus of the present invention. In the embodiment of FIG. 5, with the cylindrical cover 50, the apparatus is fitted therein by mounting the mounting rods 22, 23 on a base 47 which is supported in cover 50 by means of a metal element 48 in the shape of an arc to fit tightly in cover 50.

It will be obvious to those skilled in the art that various changes may be made without departing from the scope of the invention and the invention is not to be considered limited to what is shown in the drawings and described in the specification.

We claim:

1. A signalling device for use with a fishing rod and activated by a fishing line comprising
   a compartment for the signalling device,
   entering and exit passages to said compartment allowing a fishing line to pass through said passages and said compartment,
   a switching means in said compartment to signal the amount of pull on the fishing line including
      movable means moved by the fishing line a distance determined by the intensity of the force of the pull on the fishing line,
      opposing means to exert a force to oppose the force of the fishing line on said movable means,
      a plurality of contact means extending in the path of said movable means to close an electrical circuit when establishing contact with said movable means,
      a plurality of lamps, each of said lamps in a circuit with one of said contact means,
      a source of power for said lamps,
      and means to extinguish one of said lamps when another of said lamps is lit.

2. The signalling device of claim 1, further characterized by
   said movable means being a rod movably mounted on a pair of uprights for movement in a plane perpendicular to the direction of extension of the fishing line.

3. The signalling device of claim 2, further characterized by
   said opposing means being a coiled spring at each of said uprights supporting said rod against the force exerted by the fishing line.

4. The signalling device of claim 2, further characterized by
   said contact means spaced to contact said rod each at different positions along its path of travel.

5. The signalling device of claim 4, further characterized by
   said means to extinguish lamps including
      auxiliary contacts in a normally closed circuit with said contact means which are opened upon further movement of said rod due to additional pull on the fishing line,
   one of each of said lamps electrically connected without interruption to each of said auxiliary contacts.

6. The signalling device of claim 5, further characterized by
   one of said lamps connected without interruption to said contact means spaced to contact said rod at the furtherest position along its path of travel.

7. The signalling device of claim 6, further characterized by
   said rod being an electrical contact to close the circuit when contacting said contact means.

8. The signalling device of claim 1, further characterized by
   a scale mounted for movement with said movable means,
   indexing means cooperating with said scale to designate the amount of pull on the fishing line.

9. The signalling device of claim 8, further characterized by said scale being a substantially U-shaped member with the legend on the leg of the U other than a leg attached to said movable means, and said indexing means being an opening in said compartment to reveal a portion of said legend.

10. The signalling device of claim 1, further characterized by each of said lamps being identifiable by different color.

11. The signalling device of claim 8, further characterized by an additional lamp connected between said power source and a contact means of said plurality of contact means which is first to be contacted by said movable means whereby said additional lamp lights said scale when pull is exerted on the fishing line.

12. The signalling device of claim 1, further characterized by a casing containing a fishing reel, said switching means positioned within said casing, and mounting means to mount said switching means within said casing.

13. The signalling device of claim 12, further characterized by said mounting means including a base for said switching means, and an arc-shaped element connected to said base at the ends of the arc and of a size to fit tightly within said casing.

14. The signalling device of claim 13, further characterized by said casing having a substantially cylindrical shape, a scale having a substantially U shape with one leg of the U having a curved surface to conform to the shape of said casing, said scale mounted for movement with said movable means, and indexing means cooperating with said scale to designate the amount of pull on the fishing line.

* * * * *